INVENTOR.
PARK H. MILLER, JR.

BY Anderson, Luedeka, Fitch, Even, & Tabin
ATTORNEYS

INVENTOR.
PARK H. MILLER, JR.

BY Anderson, Luedeka, Fitch, Even, & Tabin ATTORNEYS

INVENTOR.
PARK H. MILLER, JR.

BY Anderson, Luedeka, Fitch, Even & Tabin
ATTORNEYS

INVENTOR.
PARK H MILLER, JR.

BY Anderson, Luedeka, Fitch, Even, & Tabin
ATTORNEYS

INVENTOR.
PARK H. MILLER, JR.

BY Anderson, Luedeka, Fitch, Even, & Tabin
ATTORNEYS

United States Patent Office 3,469,189
Patented Sept. 23, 1969

3,469,189

METHOD AND SYSTEM FOR COMMUNICATION OF INFORMATION UTILIZING PULSE COMPRESSION PRINCIPLES

Park H. Miller, Jr., Del Mar, Calif., assignor, by mesne assignments, to Gulf General Atomic Incorporated, San Diego, Calif., a corporation of Delaware Filed Apr. 1, 1966, Ser. No. 539,381
Int. Cl. H04b *7/00, 1/04, 1/16*
U.S. Cl. 325—38 23 Claims

ABSTRACT OF THE DISCLOSURE

A method and system for communicating information utilizing a particular form of transmitted signals and the processing of the received signals to produce compressed pulses. The transmitted signals are each a number of short wave trains of different frequencies in specified time relationships. The received signals are applied to active filters tuned to respective transmitted frequencies to produce detection signals corresponding to the transmitted wave trains. The detection signals are combined in such time relationships as to produce a composite pulse corresponding to each of the transmitted signals compressed in time relative to the duration of each applied short wave train.

This invention relates generally to communication methods and systems, and more particularly, to a communication method and system of the pulse type utilizing improved pulse compression and filtering techniques.

In general, an idealized communication system includes an information source which produces a message, a transmitter which encodes the message into a signal and transmits the signal into a communication channel, and a receiver which detects the signal after it has passed through the channel, the detected signal then being decoded into a message which can be recognized by an information destination, which is the person or thing for which the message is intended. The signal transmitted by such systems is often in the form of waves, such as sound waves or electromagnetic waves, in an appropriate medium. The signal which is detected by the receiver generally differs from the signal which is transmitted because of noise and distortion added while the signal is passing through the communication channel. In designing communication systems, the characteristics of the source, the channel and the destination are considered to be beyond the designer's control, and attention is centered on improvement of the transmitter and receiver.

The amount of information which can be communicated by a communication system depends upon the ratio of the power of the signal transmitted to the power of the noise introduced in the channel, upon the bandwidth of the channel and upon the length of time during which transmission takes place.

In order to overcome the adverse effects of noise on the amount of information transmitted, it is generally desirable to increase the rate at which the transmitter applies energy to the medium, thereby increasing the signal power and the signal-to-noise ratio. In any communication system, however, the rate at which energy may be applied to the system is subject to the physical limitations of the system components. Consequently, it is sometimes expedient to apply the energy of the signal over a longer period of time so as to minimize component failure. On the other hand, as the amount of time during which a given amount of signal energy is applied and is received increases, the rate of transmission of information will ordinarily decrease. Accordingly, for rapid and accurate transmission of information, it is desirable to use high energy pulses or wave trains having relatively limited duration. One approach to this problem of increasing the capacity of a communication system without exceeding the physical limitations of the system components is to transmit and receive relatively low energy wave trains having relatively long duration and to compress the received wave trains into signals of high energy and relatively short duration, a process referred to generally as pulse compression.

Pulse compression may be achieved by transmitting wave trains of particular characteristics and passing the received wave trains through what is known as a matched filter. One form of a matched filter is designed to process transmitted waves which have the form of a swept frequency-modulated waveform, i.e., a waveform whose frequency varies continuously over a specified bandwidth. The received signal is placed, for example, in a delay line which is tapped at positions selected in accordance with the frequency sweep rate so that at a particular time the output signals at all of the taps will be in phase. These in-phase output signals are then combined to form a compressed pulse. In order to achieve maximum pulse compression with such a filter, the number of taps on the delay line should be about 2TB where T is the duration of the signal and B is the average modulation frequency. Such systems, of course, are expensive due to the relatively large number of taps required.

Moreover, as previously noted, the information capacity of a communication system depends upon the bandwidth of the channel as well as the signal-to-noise ratio. Utilization of a frequency modulated wave train as is done with the above described matched-filter pulse-compression technique requires a channel with a relatively large bandwidth. Unfortunately, the available bandwidth is often limited by such factors as the nature of the medium in which the waves travel and the characteristics of available components for communication systems. As a result, communication systems utilizing pulse compression techniques have proved costly due to the need for large bandwidth or high signal power, as well as the large number of delay line taps as previously mentioned.

An important feature of the present invention is to provide a communication system and method utilizing improved pulse compression and filtering techniques in which the capacity of the system will be optimized within limitations of available bandwidth and signal power without unduly increasing the cost of the system. This result is achieved by applying signals to the medium, each of the signals being in the form of a plurality of short wave trains or pulses with each of the pulses being at a different respective frequency and of limited duration. The wave trains which are detected after passage through the medium are combined in a predetermined time relationship so as to provide compressed pulses of energy corresponding to the transmitted signals. The time, polarity, frequency spectrum, and relationships of the compressed pulses such as their relative times, amplitudes and polarities may each be such as to provide information to the information destination in accordance with conventional coding methods.

It is therefore an important object of the invention to provide an improved method and system for the communication of information.

Another object of the invention is to provide an improved communication system which has a relatively high capacity for transmission of information within a narrow bandwidth and utilizes power sources of limited strength.

A further object of the invention is to provide a reliable and rapid method and system of communication utilizing an improved and simplified pulse compression technique.

A still further object of the invention is to provide a method and system for communication utilizing pulse compression in which use may be made of time, amplitude and frequency component characteristics of the signals.

Another object of the invention is to provide a communication system utilizing components which are reliable and easily maintainable and which is simple in construction and operation, thereby providing cost advantages over present systems.

Still another object of the invention is to provide a method of simultaneously transmitting a number of signals in a narrow bandwidth channel, which signals may readily be distinguished.

Yet another object of the invention is to provide a useful solution to the problem of how to achieve high signal-to-noise ratios in communication systems without undue sacrifice of speed or excessive bandwidth requirements.

Another object of the invention is to provide a communication method and system with which the changes in a transmitted signal occasioned by the passage of the signal through a medium may be compensated for in such a manner that the processed signal furnished to the information destination is the same as if the transmitted signal had reached the receiver uninfluenced by the medium.

Other objects and advantages of the invention will become apparent from the following description when considered in conjunction with the accompanying drawings, in which.

Figures 1, 2, 4:
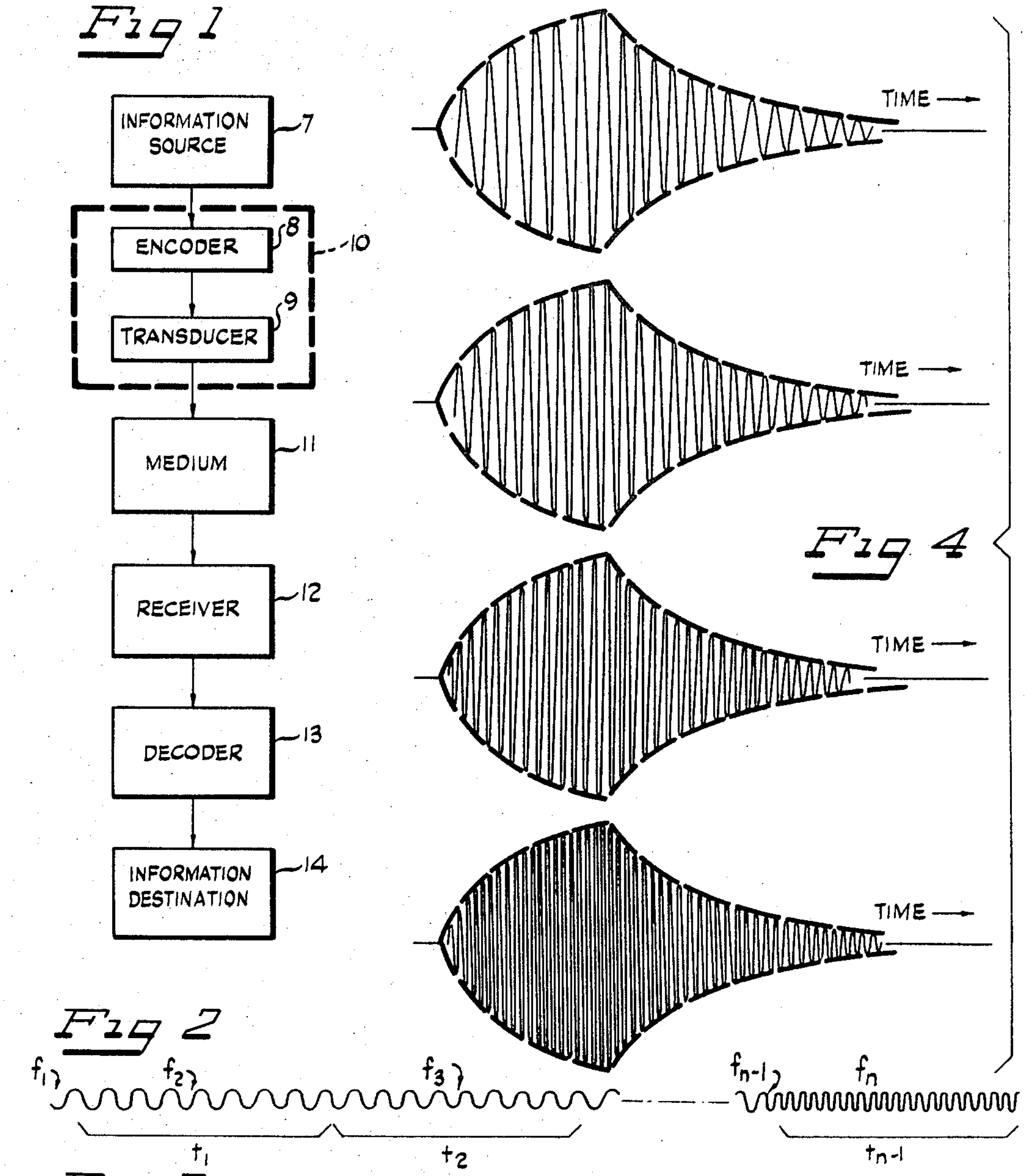
FIGURE 1 is a diagrammatic illustration of the communication system of the present invention.
FIGURE 2 is an illustration of a typical transmitted signal utilized in practicing the invention.
FIGURE 4 shows certain typical, idealized waveforms as produced by filtering the received and detected signal as described herein.

As illustrated in FIGURE 1, the communication system generally includes an information source 7 which produces a message or information, and an encoder 8, and a transducer 9 which together comprise a transmitter 10. The encoder 8 transforms the information into a form suitable for transmission while the transducer 9 supplies waves to the medium 11 in accordance with the output of the encoder. The medium 11 supplies a communication channel. After the waves have traveled through the channel, they are detected by a receiver 12 and transformed by a decoder 13 into a foam which is recognizable by an information destination 14.

It is an important feature of the method and system of the present invention that each of the transmitted signals comprises a plurality of wave trains or pulses of limited duration and different respective frequencies and having first time relationships with one another.

After the wave trains have traveled through the medium 11, they are detected by the receiver and utilized to produce detection signals which are systematically related to the received wave trains. The detection signals are then combined in second time relationships to produce one or more composite signals or pulses which are systematically related to the transmitted signals. The transmitted signals are applied to the meduim in accordance with a predetermined code, the variables of which are the first time relationships and the frequencies utilized. Changes in these variables affect in a determinable manner the frequency spectrum of each composite pulse and its relationships with other composite pulses produced by the system such as relative time, amplitude or polarity. Hence, these characteristics of the composite pulses are indicative of the information transmitted.

Since an important feature of the invention is the utilization of a plurality of wave trains to form each transmitted signal and the combination of the detection signals in the receiver 12 to produce a composite pulse, the description of the invention begins with this feature and is initially confined to the transmission of a single signal and the production of a single composite signal therefrom. After basic characteristics of the signals are set forth, a variety of alternative first time relationships, second time relationships and sets of wave trains which may be utilized will be explained. Finally, methods and means for simultaneously utilizing a plurality of such signals to transmit information will be set forth.

More particularly, each transmitted signal preferably comprises a plurality of wave trains of limited and usually substantially equal duration, each of which has a different predetermined frequency. The wave trains or pulses, as stated above, have first time relationships with one another. The detection signals which are produced as a result of the detection of the wave trains after they have passed through the medium are combined with one another in second time relationships. Preferably, these second time relationships are such that the detection signals will all reach a peak more or less simultaneously during a particular half cycle of such detection signals. The resulting composite signal has a recognizable peak and is similar in form to the so-called Ricker wavelet and to the waveforms produced by autocorrelation techniques. The system is paticularly suited to a binary code. Alternatively, the peak of the wavelet may be located on a time scale with great precision, as will be hereinafter described, and hence time coding of a plurality of such signals is feasible. Furthermore, the amplitude of the composite signal or its polarity, i.e., whether it is positive or negative, may be predetermined, and coding on this basis is also feasible. In addition, the transmission of information is facilitated by the fact that more than one signal having different component wave trains may be transmitted at the same time, and yet such signals may be distinguished from one another, as will also be described in detail hereinafter.

It will be apparent that neither the nature of the medium nor the nature of the waves to be transmitted is critical. For example, electromagnetic waves in a variety of frequency bands might be utilized as could sound waves in a liquid, solid or gaseous medium. For convenience, the invention will be described herein primarily with reference to low frequency sound waves traveling through water, such as may be produced by the apparatus described in my copending application entitled "Sound Source," filed concurrently herewith and now U.S. Patent No. 3,373,841, but no unnecessary limitation of the invention is to be implied therefrom. Conventional sound sources may be utilized if desired, however, and in certain applications may be quite useful as will be noted hereinafter.

In a specific exemplary mode of operation of the present invention, with reference to which the invention generally will be described herein, each transmitted signal comprises fifteen wave trains of sound having selected different frequencies ranging between 36.0 cycles per second and 99.0 cycles per second and are linearly distributed, i.e., there is a constant frequency differential between adjacent frequencies of the set. The wave trains of the respective frequencies in this example are of substantially equal duration and the number of cycles in each wave train is selected to meet this criterion. More specifically, the set of frequencies, the number of cycles of each and the duration of each wave train in this example are shown in Table I.

TABLE I

| Frequency (c.p.s.) | No. of cycles | Wave train duration (sec.) |
|---|---|---|
| $f_1$-36.0 | 7 | .194 |
| $f_2$-40.5 | 8 | .198 |
| $f_3$-45.0 | 9 | .200 |
| $f_4$-49.5 | 10 | .202 |
| $f_5$-54.0 | 11 | .204 |
| $f_6$-58.5 | 12 | .205 |
| $f_7$-63.0 | 13 | .206 |
| $f_8$-67.5 | 14 | .207 |
| $f_9$-72.0 | 15 | .208 |
| $f_{10}$-76.5 | 16 | .209 |
| $f_{11}$-81.0 | 17 | .210 |
| $f_{12}$-85.5 | 18 | .211 |
| $f_{13}$-90.0 | 19 | .211 |
| $f_{14}$-94.5 | 20 | .212 |
| $f_{15}$-99.0 | 21 | .212 |

The average frequency is 67.5 cycles per second, and the average wave train duration is .206 second for this specific set of wave trains. It may also be noted that the duration of each wave train is less than the reciprocal of 4.5 c.p.s., the difference between successive frequencies, in order to minimize the amplitude of the secondary maxima on each side of the main peak of the composite signal which is produced as described below.

One among many advantages of this particular selection of frequencies and wave train lengths, is that the composite signals or pulses produced in the manner to be hereinafter described will not be appreciably altered if one, or even a few, frequencies are omitted from the set in order to avoid particular ambient noise frequencies. Also, additional frequencies in the same linear set may be added at either end or the entire set shifted up or down in the frequency spectrum without appreciable effect on the composite signal. Furthermore, the frequencies may easily be produced successively by the apparatus of my copending application "Sound Source" mentioned hereinabove.

It should be emphasized, however, that the above described set of frequencies is merely exemplary and is described herein for clarity and ease of understanding. The distribution of frequencies need not be linear, and indeed secondary maxima in the composite signal or pulse may be minimized by using a non-linear distribution. More particularly, a logarithmic distribution is preferred in many applications. It will also be apparent that this set of frequencies or other sets in the same or a different general range could be utilized to modulate a carrier frequency for transmission, and the received signals could be demodulated after detection to restore the original modulating wave trains. When operating with sound waves traveling in water, it may be desired to utilize a carrier frequency of approximately 3,000 c.p.s. with a set of modulating frequencies in the range from 0 to 100 c.p.s., so that waves traveling in the water will have frequencies in the range from 3,000 c.p.s. to 3,100 c.p.s.

When such a modulation procedure is utilized in a dispersive medium, i.e., where velocity is a function of frequency, the wave trains of the modulated signal are delayed by different relative amounts than the wave trains themselves are delayed when transmitted at their lower frequency. This effect would change the form of the composite processed signal produced if the second time relationships were not adjusted to compensate therefor. Utilizing the apparatus described hereinafter, however, it is relatively simple to adjust the second time relationships so that the processed signal is the same as if it had reached the receiver uninfluenced by the medium.

The wave trains which are applied to the medium and comprise each transmitted signal have first predetermined time relationships with each other. As shown in FIGURE 2, which illustrates some of the transmitted wave trains, one set of such relationships is such that $n$ wave trains are successively applied to the medium beginning with the lowest frequency $f_1$ and proceeding to the highest frequency $f_n$ at first time intervals (designated as $t_1, t_2, \ldots t_{n-1}$) between the positive peaks of the last cycles of successive transmitted wave trains, although other predetermined peaks of the wave trains may be used as reference points for measuring these intervals, such as, for example, the negative peaks of the last cycles of successive wave trains.

As shown, these first time intervals may be made equal to the duration of the respective pulses so that each pulse follows immdiately after the preceding one and, with the parameters of Table I, the total duration of each transmitted signal is about 3 seconds. It is also possible, however, for the first time intervals to be such that the transmitted wave trains in a particular transmitted signal overlap one another. Indeed, a particular time relationship in which the wave trains overlap one another so as to produce a combined wave train having a uniform distribution of energy is especially useful and will be described in detail below. In addition, the order of the frequencies may be varied, as for example, beginning with the highest frequency $f_n$ and proceeding to the lowest frequency $f_1$. A particularly useful application of such an order of transmission also will be described below, but, for ease of understanding, reference will generally be made to the transmission of wave trains in an ascending order of frequencies.

After the wave trains have traveled through the medium to the location of the receiver, they are detected. Where the waves are produced by a sound system such as is described in my previously mentioned co-pending application entitled "Sound Source" or the conventional sources of waves in water or the ground, the sound waves may be detected by conventional hydrophones or geophones having transducer means to produce an electrical output signal.

Figure 3:
FIGURE 3 is an illustration of a typical signal as received after the passage of the transmitted signal through the medium and the consequent addition of noise.

The wave trains which are received are affected by noise, which may have much greater amplitude than the transmitted waves. In such a case, the received signal corresponding to a particular transmitted signal may have an appearance as shown in FIGURE 3. The effect of such noise which is added to the signal during its passage through the medium may be much reduced by detecting each wave train through its own appropriately tuned narrow band-pass electrical filter. It would also be possible to reduce noise by applying autocorrelation techniques to the received signal. It is preferred in the present invention, however, to utilize simple filters which operate in real time so that the processing time usually required with correlation techniques is eliminated. Two specific examples of such filters will be described hereinafter.

When utilizing wave trains of short finite length, the envelope of the output of such filters gradually increases, reaching a peak with the last wave of a train and thereafter gradually diminishing. The waveforms of such wave trains after they have passed through such filters are shown in FIGURE 4. However, these forms are shown for a noiseless condition to illustrate the invention, and further they are not to the same scales as the waveforms of FIGURES 2, 3 and 5. The outputs of the filters are then combined with one another in predetermined second time relationships to form a composite signal. It is an important feature of the present invention to utilize first and second time relationships such that the composite signal may easily be recognized and used to communicate information.

Figure 5:
FIGURE 5 is an illustration of a typical combined signal as produced by practicing the present invention.

More specifically, it is preferred to combine the detection signals in second time relationships such that they will all be in phase at the peak of the half-cycle of each which corresponds to the last positive half cycle of the transmitted wave trains. It may be seen from examination of the waveforms shown in FIGURE 4, that this peak has the largest amplitude in each detection signal. As a result of this mode of combining the filtered detection signals so that the peak half-cycles coincide, the composite signal thereby produced has a sharp positive peak while the detection signals on the average substantially cancel one another at other times. The position on a time scale of the sharp peak corresponds to the times of the peaks of the last transmitted positive half cycles of the first wave trains. The waveform of a typical composite signal as thus produced is shown in FIGURE 5.

Figure 6:
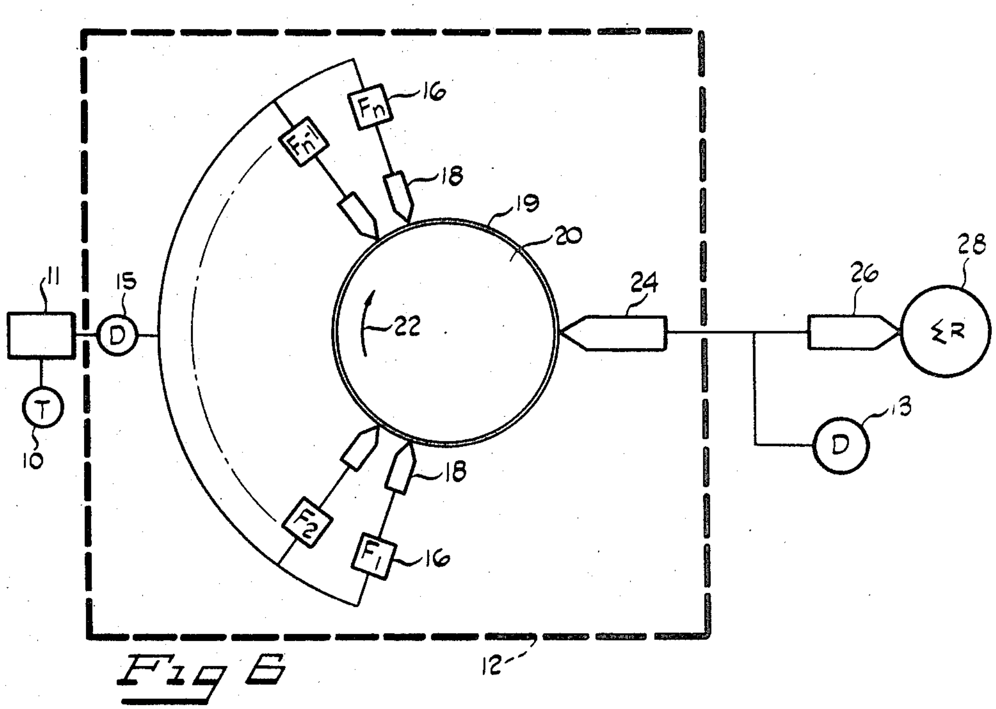
FIGURE 6 is a diagrammatic illustration of the system including magnetic recorder apparatus which may be utilized in practicing the invention.

A receiver 12 for accomplishing the detection of the transmitted wave trains and their combination into the composite signal, which is particularly useful where the range of frequencies of the wave trains employed is from 0 to 50,000 cycles per second, is illustrated in FIGURE 6. The waves are applied to a medium 11 by a transmitter 10 which may be, for example, the apparatus described in my previously mentioned application entitled "Sound Source," and are detected by a receiver 12 which includes a detector 15 which may be the conventional hydrophone or geophone previously mentioned and which converts them into electrical output signals. The electrical output signals produced by the detector 15 in response to the transmitted waves are applied to a plurality of narrow band-pass electrical filters 16 arranged in parallel, each of which is pretuned to one of the transmitted frequencies.

During any given period of time when a particular wave train is being received and applied to all the filters, the output of the filter tuned to the frequency of that wave train is similar to the waveforms shown in FIGURE 4, while the output of the other filters is essentially zero. In the specific example previously mentioned wherein the first wave trains are transmitted successively, the output of the filter tuned to the first frequency will begin when that frequency is detected and will build up to a peak as shown in FIGURE 4, while the output of the filters tuned to the other frequencies will be relatively negligible. At the time the output of the first filter reaches its peak, the output of the filter for the second frequency will start up and rise to a peak while the output of the first filter decays, as shown in FIGURE 4. The output of each filter is applied to a respective recording head 18 which then records the detection signal for the respective selected frequency on a record medium 19, such as, for example, magnetic tape mounted on a drum 20 rotating in the direction of the arrow 22.

The recording heads 18 are located at selected points axially and circumferentially spaced along the surface of the recording drum 20, which rotates at a predetermined velocity. The result of the axial spacing is that the detection signal produced by each filter 16 is recorded on a separate parallel track of the record medium 19. Records of signals produced on the respective recording tracks by the recording heads 18 may then be combined by a read-out device 24. The read-out device 24 may be, as shown, a single pickup head covering all the recording tracks whereby the recorded detection signals are combined. In this event the relative circumferential spacing of the recording heads 18 and the velocity of rotation and size of the recording drum 20 determine the second time relationships in which the detection signals are combined.

Alternatively, a plurality of pickup heads spaced axially and circumferentially along the surface of the recording drum 20 with one on each track may be utilized and their outputs combined electronically in which case the circumferential spacing of the pickup heads will also affect the second time relationships. In any event, the read-out device 24 preferably includes an integrating amplifier so that the output thereof is proportional to magnetic flux rather than to the time rate of change of flux, as is true for ordinary reading heads. The combined signal produced by the read-out device 24 is the output signal of the receiver 12. It may be recorded by a stylus 26 on a combined signal recorder 28 for later recording, or may be applied directly to the decoder 13. Both connections are shown in FIGURE 6.

Figure 7:
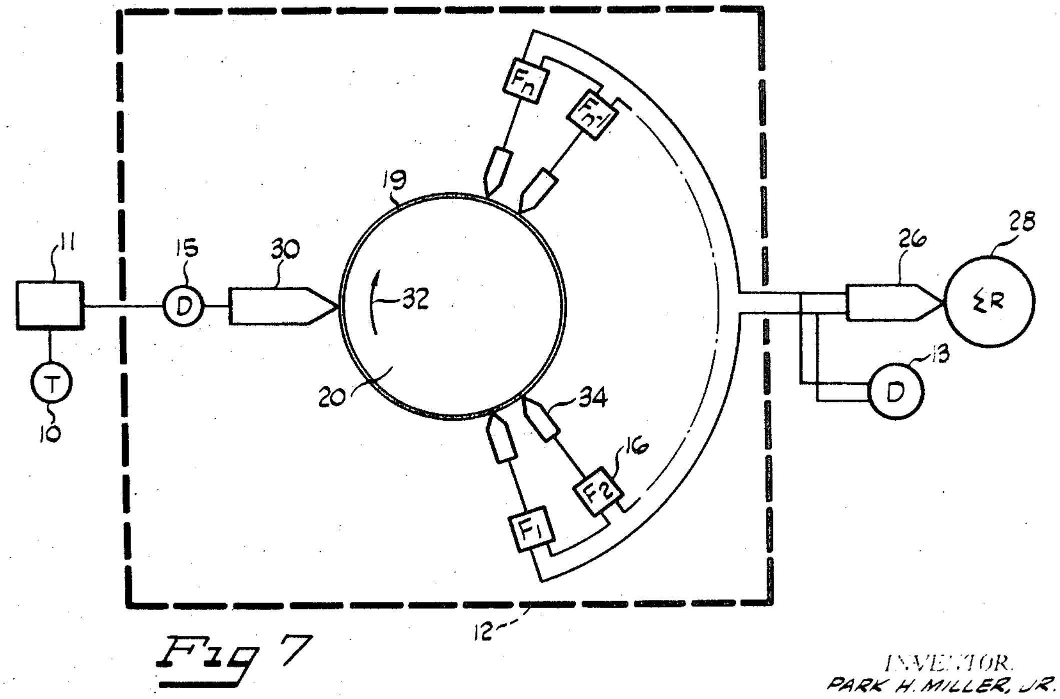
FIGURE 7 is a diagrammatic illustration of the system including a modified magnetic recorder apparatus which may be utilized in practicing the invention.

It is apparent that the position of the electrical filters 16 relative to the other parts of the apparatus may be modified. For example, in the apparatus which is illustrated in FIGURE 7, the waves produced by the detector 15 are applied through a single first recording head 30 to a single recording track on a recording medium 19 mounted on a drum 20 rotating in the direction of the arrow 32. A plurality of read-out heads 34, each of which includes an integrating amplifier and which is connected to a respective one of the filters 16, are located at selected points circumferentially spaced around the drum 20. The output of the filters 16 may be applied in series to the recording stylus 26 for recording on the signal recorder 28 or to the decoder 13. Utilizing this arrangement, the second time relationships in which the detection signals are combined, are determined by the relative circumferential spacing of the read-out heads 34 and the velocity of rotation and size of the drum 20.

Figure 8:
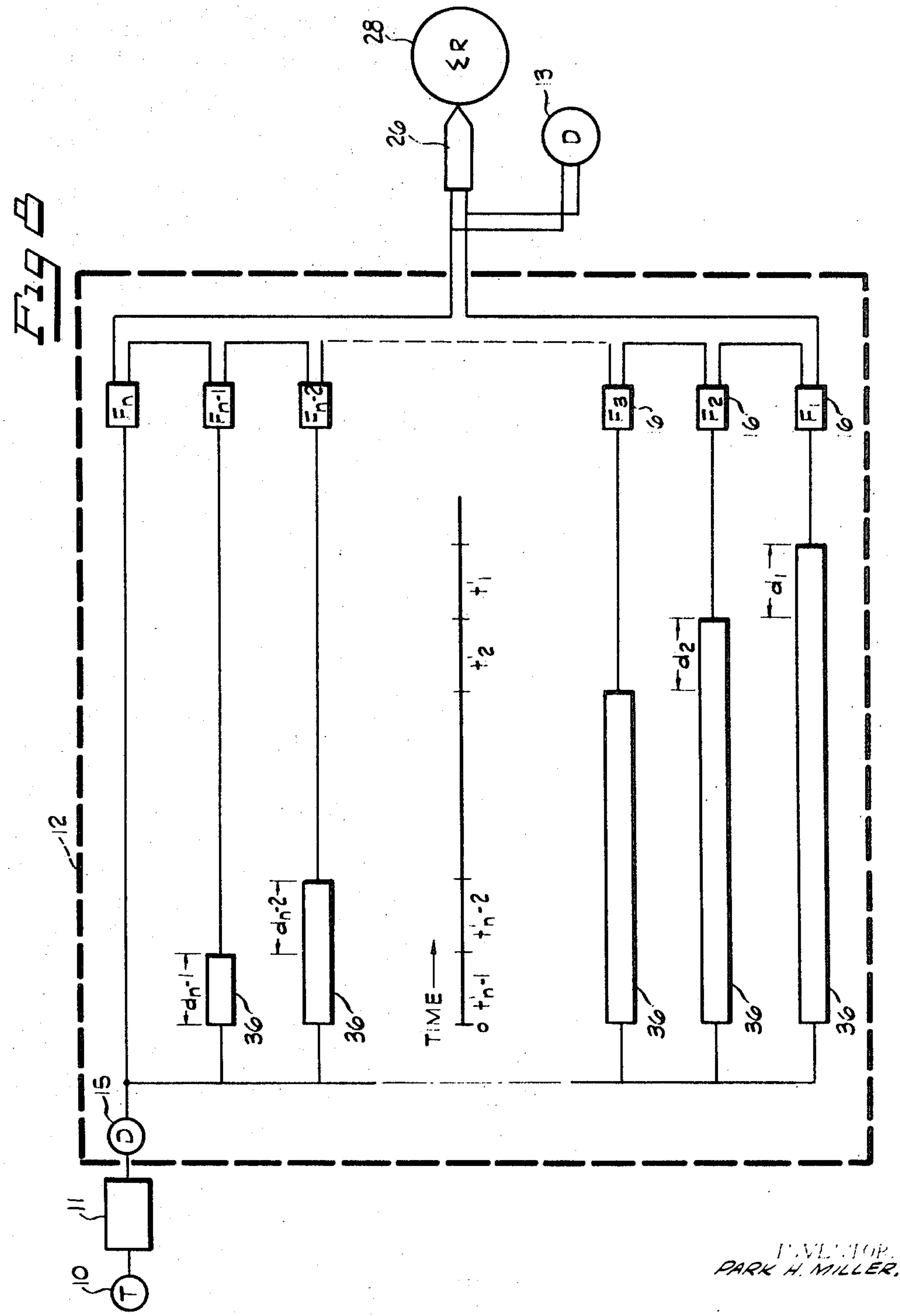
FIGURE 8 is a diagrammatic illustration of the system including a delay line apparatus which may be utilized in practicing the invention.

Another apparatus, which is particularly useful in the frequency range from 5,000 cycles per second to one megacycle per second is illustrated in FIGURE 8. In this apparatus, the electrical output of the detector 15 is put into a plurality of delay lines 36 arranged in parallel. These delay lines 36 provide various respective lengths of time delay of the received signals. At the output of each delay line 36 is one of the tuned filters 16 to which the delayed signal in the respective delay line is applied. The detection signals produced by the filters 16 may be combined serially and applied to the recording stylus 26 for recording on the combined signal recorder 28 or applied to the decoder 13. The second time relationships in which the detection signals are combined are determined in this form of apparatus by the relative lengths of the respective delay lines 36.

Each of the devices illustrated in FIGURES 6, 7 and 8 performs the function of producing detection signals systematically related to the transmitted wave trains, which detection signals are relatively free of noise and free of cross-talk from other frequencies also being transmitted by virtue of the operation of the narrow band-pass filters 16. Furthermore, each of the illustrated devices performs the function of determining the second time relationships in which the detection signals are combined by delaying such detection signals relative to one another by a predetermined amount before they are combined.

The amount of this delay may be easily changed to compensate for any dispersive effect of the medium on the transmitted signal, i.e., for additional relative delay caused by a dependence of the velocity of the waves in the medium upon their respective frequencies.

The amount of this delay may be seen most clearly in FIGURE 8 where the difference in length of adjacent delay lines 36 (designated as $d_1$, $d_2$, . . . $d_{n-1}$) divided by the velocity of propagation of the wave trains in the lines equals the respective relative delay times (designated as $t_1$, $t_2$, . . . $t_{n-1}$) of the detection signals. Similarly, in the apparatus of FIGURE 6, the circumferential distance of each recording head 18 from a head connected to a selected filter, such as the filter $F_1$ tuned to the frequency $f_1$ of a wave train, divided by the velocity with which the record medium 19 moves is equal to the delay time relative to the particular selected wave train. In a like manner, the relative delay times of the detection signals in the apparatus of FIGURE 7 are equal to the circumferential distances of the read-out heads 34 from the recording head 30 divided by the tangential velocity of the drum 20.

In the specific exemplary mode of operation of the invention which has been previously mentioned, the transmitted wave trains in each transmitted signal have first time intervals between the positive peaks of the last cycles of successive wave trains. Utilizing the apparatus of FIGURE 6, for example, the spacing of the recording heads 18 alone or in conjunction with the velocity of the drum 20 may be adjusted so that the detection signals when combined by the read-out device 24 are all in phase during the half cycle of each which corresponds to the last positive half cycle of the first wave trains. Since this half cycle has the largest positive amplitude, the composite signal produced has a large positive peak corresponding to the time of the last transmitted positive peak while at other times the detection signals on the average substantially cancel one another. Assuming the transmitter and receiver are not in motion relative to one another, this result may be accomplished by making the relative delay times of the last peaks ($t_1'$, $t_2'$, . . . $t'_{n-1}$) equal to the first time intervals ($t_1$, $t_2$, . . . $t_{n-1}$). The form of the composite pulse produced is shown in FIGURE 5. Similar results may be achieved utilizing the apparatus of FIGURE 7 by adjusting the circumferential spacing at the read-out heads 34 alone or in conjunction with the velocity of the drum 20, or utilizing the apparatus of FIGURE 8 by adjusting the lengths of the delay lines 36.

Figure 9:
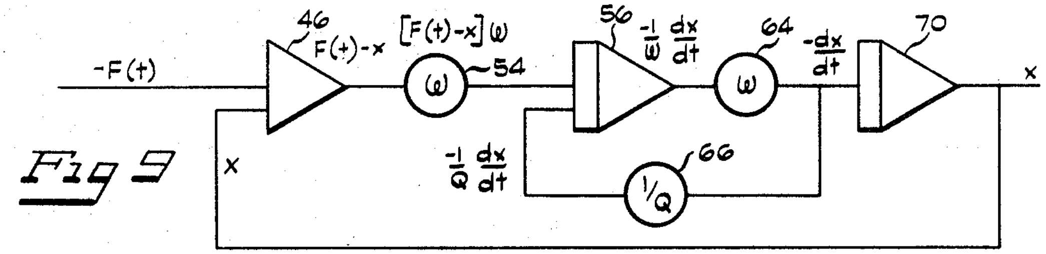
FIGURE 9 is a diagrammatic illustration of one embodiment of a filter useful in the system shown in FIGURES 6, 7 and 8.

It has been found preferable to utilize as each of the filters 16 a so-called operational filter in the form of a narrow band, active filter having adjustable frequency and Q controls. The filter is based upon the analog simulation of the differential equation of a damped linear oscillator that is excited by an input signal of the resonant frequency. The frequency and Q controls are adjusted to provide a filter response approximating the correlation function for the particular wave train frequency and length. The differential equation is:

$$\frac{d^2x}{dt^2}\,\frac{\omega}{Q}\,\frac{dx}{dt}\,\omega^2x=\omega^2F(t)$$

where F($t$) is the input function which contains a desired received signal characterized by the effective resonant filter frequency mixed with varying amounts of noise. This converts to:

$$\frac{1}{\omega}\,\frac{d^2x}{dt^2}=\omega[F(t)-x]-\frac{1}{Q}\,\frac{dx}{dt}$$

which can be set up in analog form as in FIGURE 9.

It should be noted that $\omega$ for a 100 c.p.s. signal would be 628 while a coefficient potentiometer yields a number only from 0 to 1. For this reason the $\omega$ setting is really $\omega$/1,000 and both such settings are followed by integrators with a gain of 1,000 to compensate. This also keeps the integration capacitors from being excessively large.

Figure 10:
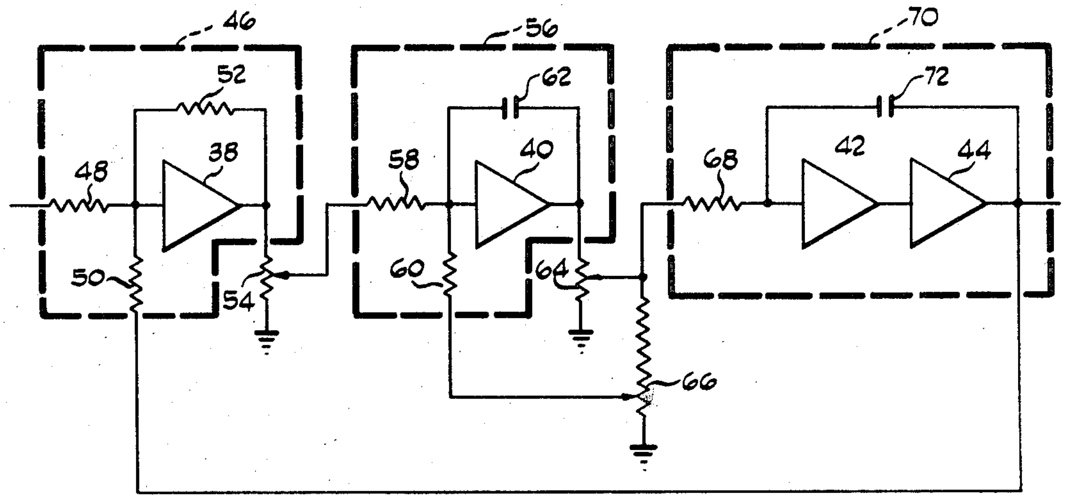
FIGURE 10 is a schematic illustration of the filter shown in FIGURE 9.

The basic schematic is preferably as shown in FIGURE 10. The filter includes amplifiers 38, 40, 42 and 44. Amplifiers 38, 40 and 42 may be small conventional operational amplifiers having a frequency response of 0 to 10 kilocycles. Amplifier 44 may be a symmetrical emitter follower to provide a low impedance output. Amplifier 38 is part of a summing amplifier 46 to which an input signal is applied at each of input resistors 48 and 50 and which includes a feed-back resistor 52. Potentiometer 54 is a frequency control coupled between the output of summing amplifier 46 and an integrating amplifier 56. The integrating amplifier 56 comprises input resistors 58 and 60, amplifier 40 and a feed-back capacitor 62. The output of the amplifier 56 is applied to another potentiometer 64 which is also a frequency control. The output from the frequency control 64 is applied to a potentiometer 66 which is a Q control and is also applied through an input resistor 68 which is part of an integrator 70, which also includes amplifiers 42 and 44 and feed-back capacitor 72. The signal from the Q control 66 is applied through resistor 60 to integrator 56. The output of the integrator 70 is then the filter output which is passed to a recording head. It is also fed back to an input of the amplifier 46.

The operation of the amplifier may be readily understood by reference to FIGURE 9 which is a functional illustration of the filter. The operational filter is normally adjusted so that the buildup of the filter output over the duration of a single idealized detection signal and the ringing decay of the filter after the cessation of the signal form an approximately triangular envelope as shown in FIGURE 4. Amplifier 46 sums its input signals —F($t$) and $x$ and inverts the sum to produce a signal $F(t)-x$. Potentiometer 54 (with appropriate amplifier gain) multiplies the sum by $\omega$ to produce a signal $[F(t)-x]\omega$. Integrator 56 adds this signal to a signal representative of $$\frac{-1}{Q}\,\frac{dx}{dt}$$

as noted above the sum is equal to $$\frac{1}{\omega}\,\frac{d^2x}{dt^2}$$

Integrator 56 then integrates this to produce a signal $$\frac{-1}{\omega}\,\frac{dx}{dt}$$

which is multiplied by $\omega$ by potentiometer 64 (with appropriate amplifier gain) to produce a signal representative of $-dx/dt$. This signal is multiplied by $1/Q$ by the Q control potentiometer 66 to provide an input signal for integrator 56. It is also integrated to produce the signal $x$ which is the filter output and also an input signal to amplifier 46.

The filter is tuned by the adjustment of potentiometers 54 and 64. The adjustment may be made by movement of a conventional programmed frequency control switch (not shown) to provide the appropriate frequency. The Q control 66 may be similarly adjusted.

The operational filter as described in connection with FIGURES 9 and 10 features independent frequency and Q controls. However, in the case of a system utilizing sets of frequencies and numbers of cycles such that all wave trains used are of approximately equal duration, i.e., the product of the period and number of cycles in each wave train is the same for all wave trains, such as the set of frequencies and wave trains set forth in Table I, it is desirable to use a filter wherein the Q control is proportional to frequency while the frequency control is independent of Q. This can be accomplished by the filter shown in FIGURE 11.

Figure 11:
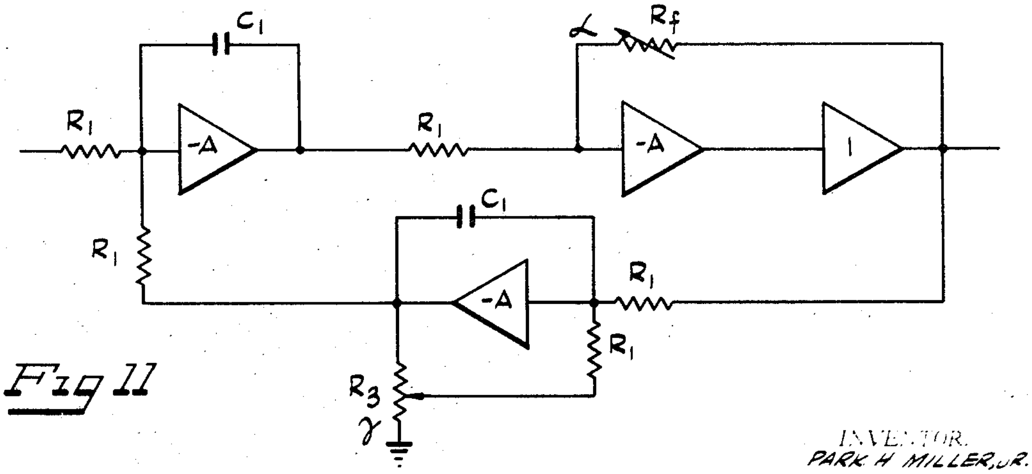
FIGURE 11 is a diagrammatic illustration of another embodiment of a filter useful in the system shown in FIGURES 6, 7 and 8.

A filter like that shown in FIGURE 11 is described in an article by F. T. May and R. A. Dandl, "Active Filter Element and Its Application to a Fourier Comb," Review of Scientific Instruments, April 1961, Vol. 32, No. 4, p. 387. This circuit requires only a single frequency control rather than the dual frequency control of the filter of FIGURES 9 and 10, and provides the desired frequency dependence in the Q control. The bandwidth and gain of this circuit are substantially identical to those of the circuit shown in FIGURES 9 and 10. The pertinent relations are as follows:

$$f\ \text{resonance}=\frac{\sqrt{\alpha}}{2\pi R_1C_1}$$

$$Q=\frac{\alpha 1/2}{\gamma}$$

$$\alpha=\frac{\sqrt{\alpha}}{\gamma}$$

$\gamma$ = Ratio on $R_3$ $$\text{Bandwidth on long wave train}=\frac{\gamma}{R_1C_1}$$

$$\text{Gain at } f \text{ resonance on long wave train}=\frac{\alpha}{\gamma}$$

The Q, controlled by $\gamma$, need be set only once for a particular time length of pulse train, and the only control requiring adjustment for different frequencies is the single frequency control $\alpha$. Thus, the control $\gamma$ can be adjusted to provide the desired Q, at a particular frequency for a wave train of the length being used, to produce the desired rate of rise and fall in the filter output. The setting of the control $\gamma$ then provides the desired Q for all other frequencies as determined by the control $\alpha$, the Q being also determined by the control $\alpha$ and hence being frequency dependent. This produces a Q that increases with frequency, which is desirable when there is appreciable increased attenuation of the higher frequencies in the transmission of the waves. Such attenuation occurs and may present great difficulties when the signals are seismic wave trains in the earth, especially when frequencies above 70 c.p.s. are utilized. On the other hand, since there is relatively little attenuation below 3,000 c.p.s., increased gain is not required for transmission through water for the attenuation of wave trains at 100 c.p.s. relative to wave trains of 30 c.p.s.

The above description has related primarily to the transmission of the wave trains forming a single transmitted signal, the detection of the wave trains by the detector 15 to produce detection signals, and the combination of the detection signals so as to produce a single composite signal of large positive amplitude and short duration. Although specific frequencies have been utilized as well as specific first time relationships between the transmitted wave trains and specific second time relationships in which the detection signals are combined in order to produce a specific form of composite signal, no unnecessary limitation should be implied therefrom, since this approach has been taken only for ease and clarity of description.

It may also be desired that the wave trains be transmitted in such a manner that the operation of the filtering apparatus at the receiver utilizing the same predetermined second time relationships will produce a composite pulse having negative polarity. This will make possible the use of binary coding on the basis of the relative polarity of the composite pulses. Such a result may be accomplished simply by changing the phase of each transmitted wave train so that the last half cycle of each, between which half cycles the first time intervals are measured, is negative instead of positive without making any concomitant change in the detection apparatus to alter the second time intervals. The result at the receiver will be that the peak half cycles of the detection signals which are all placed in phase will have negative amplitudes, and therefore the composite pulse produced by combining them in the appropriate second time relationships will also be negative.

A simple communication system would thus transmit information by digital bits. A binary code could be used with positive and negative composite pulses as the two states of the coded information signal providing information. For such systems, the information from the information source 7 would be encoded into binary bits which would be transmitted in the form of corresponding signals by the transducer 9. The receiver 12 would again transform the signals into binary bits as described above. A conventional decoder 13 would then convert the bits into a form recognizable by the information destination 14.

It is also within the scope of this invention to use the absence of a pulse instead of a positive or a negative pulse to represent one of the two states of the binary code. Alternatively, the absence of a pulse may be used in addition to both positive and negative pulses as a third state in a trinary code.

Thus far, the description has been confined to the production of positive or negative composite pulses produced by the transmission of a single set of frequencies and filtering apparatus adapted to such single set of frequencies and providing for a single set of first and second time relationships between the wave trains of each signal. It has been mentioned, however, that other first time relationships may be utilized. Among such first time relationships are ones where the wave trains comprising a transmitted signal overlap in time thereby shortening the duration of each transmitted signal and increasing the rate of information transmission. Utilizing such first time relationships, however, may increase the peak energy applied to the medium. The ultimate limit in overlapping the transmitted wave trains would occur if the wave trains of frequencies $f_1$ to $f_n$ respectively in each transmitted signal were all sent simultaneously with a selected peak, as for example, the last positive half cycle of all wave trains, being transmitted at the same time.

Such complete overlapping is undesirable because it would cause the peak of the last transmitted half cycle to be extremely large, while at other times the amplitude would be relatively small. Such a procedure is unduly demanding on system components and wasteful of energy. In addition, it might cause undesirable effects such as cavitation. It is desirable, therefore, to introduce a set of phase shifts for the various wave trains from the above described condition of simultaneous transmission, which phase shifts will result in the transmission of a transmitted signal having a substantially uniform time distribution of energy. These phase shifts may then be reversed by suitable relative time delays in the receiving apparatus so as to produce the desired peaked signal or pulse.

Figure 12:
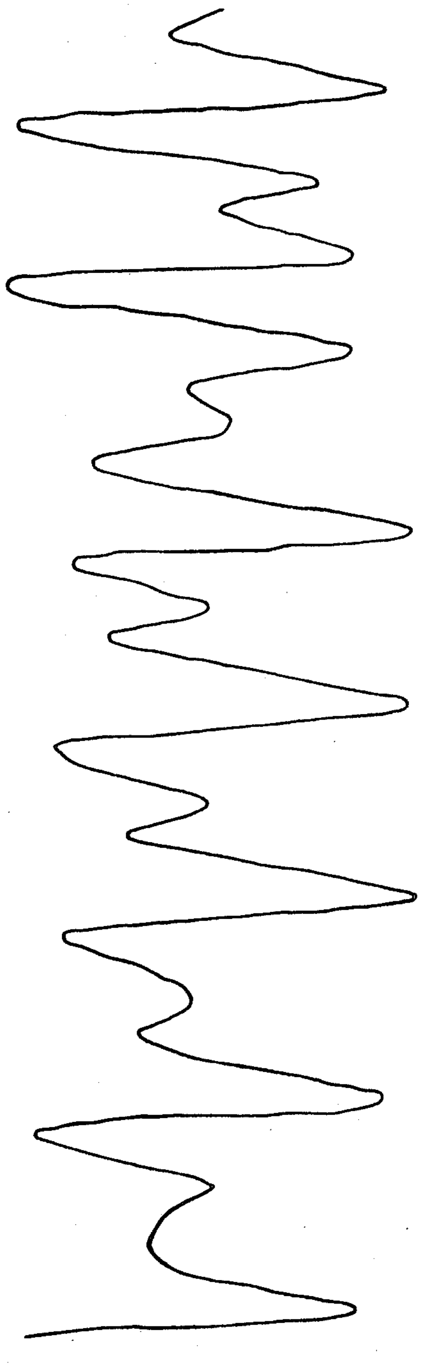
FIGURE 12 is an illustration of a modified transmitted signal utilized in practicing the invention.

An exemplary set of frequencies, number of cycles of each and the phase shifts which will accomplish this result are set forth in Table II. The transmitted waveform produced utilizing the parameters of Table II is illustrated in FIGURE 12. The phase shifts or delays represent the shift from having the peaks of the last half cycle of each train in phase. The phase shifts have been expressed in milliseconds rather than in degrees, and the last cycle of lowest frequency $f_1$ has been taken as the reference datum from which to measure the phase shifts. A negative delay signifies a shift to an earlier relative phase.

TABLE II

| Frequency (c.p.s.) | No. of Cycles | Wave train duration (sec.) | Delay for last peak (ms.) |
|---|---|---|---|
| $f_1$–30.0 | 10 | .333 | 0 |
| $f_2$–33.3 | 11 | .330 | −14 |
| $f_3$–36.7 | 12 | .327 | +3 |
| $f_4$–40.0 | 13 | .325 | −5 |
| $f_5$–43.3 | 14 | .323 | −10 |
| $f_6$–46.7 | 15 | .321 | +10 |
| $f_7$–50.0 | 16 | .320 | +8 |
| $f_8$–53.3 | 17 | .319 | +8 |
| $f_9$–56.7 | 18 | .318 | +7 |
| $f_{10}$–60.0 | 19 | .317 | −2 |
| $f_{11}$–63.3 | 20 | .316 | −7 |
| $f_{12}$–66.7 | 21 | .315 | +2 |
| $f_{13}$–70.0 | 22 | .314 | −5 |
| $f_{14}$–73.3 | 23 | .314 | +4 |
| $f_{15}$–76.7 | 24 | .313 | +1 |
| $f_{16}$–80.0 | 25 | .312 | 0 |
| $f_{17}$–83.3 | 26 | .312 | −3 |
| $f_{18}$–86.7 | 27 | .311 | +1 |
| $f_{19}$–90.0 | 28 | .311 | +3 |
| $f_{20}$–93.3 | 29 | .310 | −4 |

This represents a linear distribution of frequencies, the average frequency being 61.7 c.p.s. and the average wave train duration .318 sec. The difference between successive frequencies is 3.3 c.p.s., and the duration of each of the wave trains has been made equal to or less than the reciprocal thereof, i.e., .333 sec.

Production of wave trains overlapping in time utilizing the apparatus described in my co-pending application "Sound Source" requires the use of a plurality of such sources since each such source can transmit only one frequency at a time. Alternatively, a conventional vibrator may be used as the transducer 9 to produce mechanical waves such as the illustrated complex wave form in the medium. The transducer 9 may comprise an electrohydraulic vibrator such as is manufactured by the MB Electronics Company of New Haven, Conn., for example, Model C–126 which produces a nominal plus or minus 10,000 lb. force with a stroke of plus or minus ½ inc. over a frequency range of 5 to 3,000 cycles. Such vibrators utilize a hydraulically actuated piston to vibrate an object and control the hydraulic force on its piston by variations in the amplitude of a relatively small analog electrical signal which is connected thereto and is used as the drive or control signal.

The control signal is applied from the encoder 8, which includes means for converting the input information into signals suitable for driving the vibrator. The encoder 8 may include means for producing a signal representative of a respective pulse, which signal combines a number of wave forms of different frequencies and phase. The means for producing such a signal may comprise a magnetic tape reproducing unit and a magnetic tape having recorded thereon an electrical signal having the desired waveforms in the desired time relationships so that the resulting transmitted signal or signals can be repetitively reproduced and transmitted into the medium. Utilization of such apparatus makes possible the production of the previously described transmitted signal having a uniform energy distribution. It is apparent that the rate of transmission of information, using sets of frequencies and time relationships and encoding the information on the basis of the amplitude or polarity of the composite signal or on the presence or absence of such a signal, depends upon how close together in time two composite pulses may be produced and still be distinguished from one another. It has been found, utilizing the above described sets of wave trains, that composite pulses as close together as .016 second may be distinguished. Note however, that the duration of the transmitted signal utilizing the successive wave trains of Table I is 3 seconds and that the length of the transmitted signal comprising overlapping wave trains with a uniform energy distribution as set forth in Table II is 0.2 second. The composite pulses may be produced as close to one another as .016 second by varying the onset time of the respective trains of transmitted signals by this amount. It may be seen that this requires that the transmitted signals overlap in time. It is within the scope of the invention to utilize not only wave trains in each signal which overlap in time but also overlapping transmitted signals. Furthermore, the transmission of overlapping signals is actually more easily accomplished when the component wave trains also overlap. This is especially true when signals having the previously described uniform power distribution are utilized. In such event it is relatively simple to program a single transmitter such as the previously mentioned MB Electronics vibrator to produce such overlapping signals. Alternatively a plurality of such sources may be utilized.

The rate at which one can transmit information utilizing such signals depends upon the minimum time between peaks of the composite pulses which can be distinguished from each other and also the reproducibility of the positions of such peaks in time. In practice using frequency sets such as those set forth in Tables I and II, it has been found that peaks which are 16 milliseconds apart may be distinguished and that the relative positions of such peaks may be determined within better than one millisecond. Therefore, a time coding system may be utilized in which each successive signal is sent out at a time after the previous pulse of 16, 17, 18, . . . 30, 31, or 32 milliseconds after the previous pulse, the average time between signals being 24 milliseconds. Since this time coding provides 16 possibilities and each pulse may be positive or negative, 32 characters may be transmitted in 24 ms. on the average. Thus over 200 bits per second may be transmitted utilizing such a coding scheme.

With or without use of such overlapping transmitted signals having uniform energy distribution, the utilization of only a single set of wave trains such as those set forth in Tables I or II may also be inadequate where it is desired to increase the number of identical signals being transmitted at the same time. Therefore, an important feature of the present invention is to provide for the transmission of a plurality of orthogonal or independent signals at approximately the same time; in this context the term "orthogonal signals" means signals which may be simultaneously transmitted but may nevertheless be independently filtered or processed and thus distinguished from one another at the receiver. A preferred mode of accomplishing this result is to select a plurality of sets of frequencies in the same general range which are interleaved with one another. Thus in a simplified case, two sets of frequencies designated as $\alpha$ and $\beta$ are selected each of which comprise $n$ distinct frequencies. The frequencies are so selected that $$F_{n\beta}>F_{n\alpha}>F_{(n-1)\beta}>F_{(n-1)\alpha}\ .\ .\ .\ >f_{1\beta}>f_{1\alpha}$$

A specific example of two such sets of frequencies, the number of cycles of each and the duration of each wave train are set forth in Tables III and IV, respectively.

TABLE III.—FREQUENCY SET $\alpha$

| Frequency (c.p.s.) | No. of cycles | Wave train duration |
|---|---|---|
| $f_1$-32 | 7 | .226 |
| $f_2$-41 | 9 | .224 |
| $f_3$-51 | 11 | .219 |
| $f_4$-56 | 12 | .210 |
| $f_5$-64 | 14 | .217 |
| $f_6$-69 | 15 | .215 |
| $f_7$-79 | 17 | .217 |
| $f_8$-88 | 19 | .219 |

The average frequency for this set is 60 c.p.s.; the average wave train duration is .217 sec.; and the average difference between adjacent frequencies is 8 c.p.s.

TABLE IV.—FREQUENCY SET $\beta$

| Frequency (c.p.s.) | No. of cycles | Wave train duration |
|---|---|---|
| $f_1$-37 | 7 | .186 |
| $f_2$-46 | 9 | .196 |
| $f_3$-53 | 11 | .208 |
| $f_4$-60 | 12 | .200 |
| $f_5$-67 | 14 | .209 |
| $f_6$-74 | 15 | .203 |
| $f_7$-83 | 17 | .205 |
| $f_8$-92 | 19 | .207 |

The average frequency for this set is 64 c.p.s.; the average wave train duration is .202 sec.; and the average difference between adjacent frequencies is 7.9 c.p.s.

Figure 13:
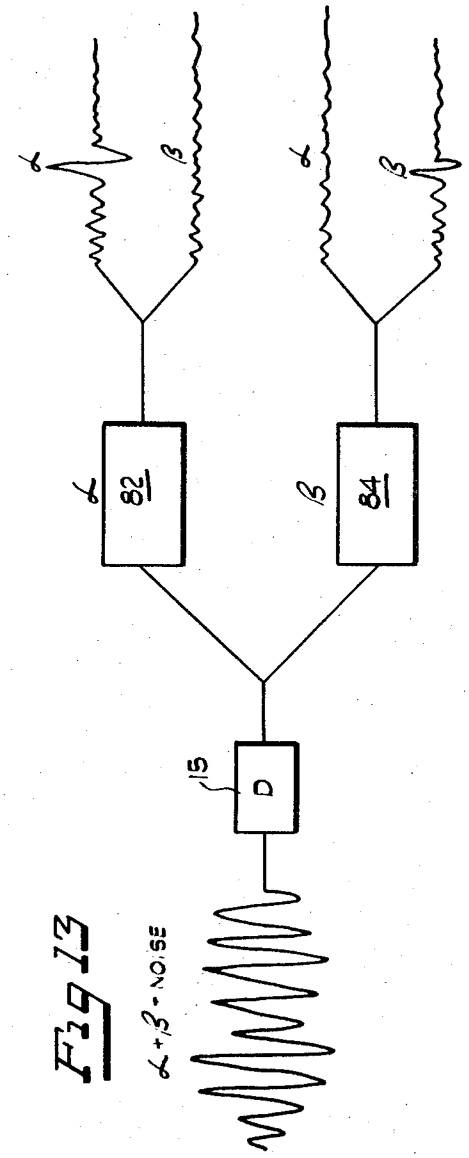
FIGURE 13 is a diagrammatic illustration of a filtering apparatus for orthogonal signals utilized in practicing the invention.

These orthogonal sets of wave trains may be transmitted more or less simultaneously and will be distinguished at the receiver. Apparatus for processing the corresponding received wave trains so as to produce separate composite signals is illustrated diagrammatically in FIGURE 13. The received signal which includes components of both sets of frequencies as well as noise is detected by a detector 15 and applied simultaneously to two filtering devices 82 and 84 each of which may be similar to the processing apparatus shown in FIGURES 6, 7 and 8, the difference between them being that the narrow band-pass electrical filters 16 in each are tuned to members of the $\alpha$ and $\beta$ sets of frequencies, respectively. The output of the devices is also shown diagrammatically in FIGURE 13. It may be seen that only the components of the $\alpha$ set result in a recognizable composite signal as the output of the $\alpha$ processing device 82, and only the components of the $\beta$ set result in a recognizable composite signal as the output of the $\beta$ processing device 84.

In order to avoid cross talk between the sets of frequencies it is desirable that the average wave train duration be about the quotient of the number of orthogonal sets of interleaved frequencies utilized divided by the average frequency difference between adjacent frequencies.

As indicated in connection with the discussion of the set of frequencies set forth in Table I, a linear distribution of frequencies may result in secondary maxima of the composite signal. This may be avoided by varying the frequencies slightly from a linear distribution or using, for example, a logarithmic distribution. When two frequencies in such a non-linear set are closer together than the average frequency difference the duration of the wave trains of such frequencies may be increased and the filters for those frequencies more sharply tuned to prevent cross talk.

An alternative method of selecting orthogonal sets of frequencies is to utilize only one set of frequencies such as those set forth in Table I but to change the order in which they are transmitted and received, as for example, by sending $f_n$ first and proceeding to $f_1$. Utilizing this procedure, the respective filters in each device 82 and 84 are tuned to the same frequencies but the amount of delay of each respective wave train before combination into the composite signal is different in each device 82 and 84.

This particular approach may also be utilized when two or more sets of frequencies are transmitted in order to minimize cross talk in the output of the filters. That is, the wave trains are transmitted in an order such that those closest to one another in frequency are remote from one another in time. An example of this method utilizing the frequency sets of Tables III and IV would be to transmit at the same time $f_1$, and $f_8$, then $f_2$ and $f_7$, and so until $f_8$ and $f_1$ are transmitted.

In any event, utilizing such orthogonal sets of frequencies, more than one such set may be applied to the medium 11 at approximately the same time and detected at approximately the same time. The amount of information communicated will, therefore, increase with the number of orthogonal sets of frequencies utilized. For example, utilizing the frequency sets set forth in Tables III and IV the duration of each transmitted signal is approximately 1.6 seconds and during this time an $\alpha$ signal, either positive or negative, and a similar $\beta$ signal may be transmitted.

The orthogonal signal scheme for increasing the capacity of the communication system may be utilized as an alternate to or in conjunction with systems of binary, amplitude or time coding. More specifically, the onset times of the various transmitted signals may be varied from one another so that the times of the respective peaks of the composite pulses are different and may be distinguished. Thus one may transmit in succession positive and negative signals, having either the same or different frequency composition or type so that transmitted wave trains forming different transmitted signals are transmitted and are traveling in the medium at the same time. The composite pulses thus produced can not only be distinguished from one another, on the basis of their frequency spectrum and polarity, but also are spaced from one another by measurable amounts of time which can be the basis for a time coding scheme as previously described. Time coding and coding on the basis of orthogonal signal sets may thus be combined. For example, the above system of time coding could be utilized for two or more orthogonal signals transmitted at the same time. Furthermore, coding on the basis of amplitude, polarity or the presence or absence of a composite signal may also be utilized in conjunction with time coding or orthogonal signal coding.

Various changes and modifications may be made in the above described communication method and system without departing from the present invention. For example, a variety of different frequencies could be utilized for the transmitted wave train sets; the first and second time relationships could be different from those specifically described; noise reducing techniques other than the described filters could be utilized; and the transmission, detection and processing of the detected signals could be performed using other apparatus which would fall within the spirit and scope of the invention, various features of which are set forth in the accompanying claims.

What is claimed is:

1. A method of communicating information comprising the steps of transmitting through a medium signals each being related to information, each of said signals comprising a plurality of transmitted wave trains, each of said transmitted wave trains being of limited duration and of a different respective substantially constant frequency, said transmitted wave trains having first time relationships with one another relative to a selected cycle of each transmitted wave train, receiving said transmitted signals after they have traveled through the medium, applying said received signals to active filter means tuned to the respective frequencies of said transmitted wave trains to produce detection signals each systematically related to a corresponding respective one of said transmitted wave trains and having a cycle corresponding to said selected cycle of the corresponding transmitted wave train, combining said detection signals in second time relationships with the cycles of said detection signals corresponding to said selected cycles of the corresponding transmitted wave trains in phase with one another so as to produce a composite pulse corresponding to each of said transmitted signals, each pulse having a duration substantially shorter than the respective durations of said transmitted wave trains and a recognizable peak, and utilizing the relationships among said composite pulses as indications of the information contained in said transmitted signals.

2. A method according to claim 1 wherein said transmitted wave trains are of substantially the same duration.

3. A method according to claim 2 wherein said selected cycles of said transmitted wave trains are the last cycle of each wave train.

4. A method according to claim 1 wherein each of said detection signals is produced by a narrow band-pass filter selectively tuned to one of said frequencies of said transmitted wave trains.

5. A method according to claim 1 wherein said relationships among said composite pulses indicative of information comprise their relative amplitudes.

6. A method according to claim 5 wherein said relative amplitudes of said composite pulses include relative polarities.

7. A method according to claim 1 wherein said relationships among said composite pulses indicative of information comprise their relative times of occurrence.

8. A method according to claim 7 wherein the onset times of transmitted signals are varied relative to one another in accordance with a predetermined code.

9. A method according to claim 1 wherein said selected cycles of said transmitted wave trains and said corresponding cycles of said detection signals each have two peaks of opposite polarity and said second time relationships are such that said corresponding cycles are substantially in phase near the peaks of said cycles having like polarity.

10. A method according to claim 9 wherein the polarity of said selected cycles of said transmitted wave trains is selected in accordance with a predetermined code and said relationships among said composite pulses are their relative polarities.

11. A method according to claim 1 wherein the frequencies of the wave trains comprising selected ones of said transmitted signals are different from the frequencies of the wave trains comprising others of said transmitted signals and wherein each of said wave trains is selectively detected through a narrow band-pass filter selectively tuned to the frequency of said wave train so that the identity of the composite pulses corresponding to particular transmitted signals is determined and information transmitted thereby.

12. A method according to claim 1 wherein said first time relationships are such that said wave trains in each transmitted signal overlap in time.

13. A method according to claim 12 wherein the first time relationships of said wave trains in each transmitted signal are also varied by predetermined amounts so as to produce a transmitted signal having a substantially uniform time distribution of energy.

14. A method according to claim 12 wherein all of said transmitted wave trains are transmitted into the medium by a common transducer.

15. A method according to claim 12 wherein said transmitted signals overlap in time.

16. A method according to claim 1 wherein said transmitted signals overlap in time.

17. A system for communicating information comprising transmission means for transmitting signals through a medium in accordance with a predetermined code, each of said transmitted signals comprising a plurality of transmitted wave trains, each of said transmitted wave trains being of limited duration and of a different respective substantially constant frequency, said transmitted wave trains having first time relationships with one another relative to a selected cycle of each, and receiving means responsive to said wave trains in the medium for receiving said transmitted signals after they have traveled through the medium, said receiving means including active filter means tuned to the respective frequencies of said transmitted wave trains for producing detection signals each systematically related to a corresponding respective one of said transmitted wave trains and having a cycle corresponding to said selected cycle of the corresponding transmitted wave train, signal combination means for combining said detection signals in second time relationships with the cycles of said detection signals corresponding to said selected cycles of the corresponding transmitted wave trains in phase with one another to produce a composite pulse corresponding to each of said transmitted signals, each pulse having a duration substantially shorter than the respective durations of said transmitted wave trains and a recognizable peak, whereby the relationships among said composite pulses are indicative of the information contained in said transmitted signals.

18. A system in accordance with claim 17 wherein said transmission means includes a common transducer for transmitting into the medium all of said transmitted wave trains.

19. A system in accordance with claim 17 wherein said active filter means comprises band-pass filter means for selecting from each of said transmitted signals as received only the component at a respective one of said frequencies, thus producing filtered detection signals.

20. A system in accordance with claim 17 wherein said transmission means transmits a signal, component wave trains of which have predetermined cycles with two peaks of opposite polarity and have first time intervals between said peaks having the same polarity, and wherein said detection signals each have peaks corresponding to said peaks of said wave trains and said signal combination means combines said detection signals so that said peaks of said detection signals coincide.

21. A system in accordance with claim 17 wherein said receiving means includes a recorder having a plurality of tracks and recording means for recording each of said detection signals on a respective one of said tracks.

22. In a system for communicating information wherein signals are transmitted through a medium, which transmitted signals are each related to the information and are each in the form of a plurality of transmitted wave trains, each of said transmitted wave trains being of limited duration and a different respective substantially constant frequency, said transmitted wave trains having first time relationships with one another relative to a selected cycle of each transmitted wave train: receiving means responsive to said wave trains in the medium for receiving said transmitted signal after it has traveled through the medium, said receiving means including active filter means tuned to the respective frequencies of said transmitted wave trains for producing detection signals each systematically related to a corresponding respective one of said transmitted wave trains and having a cycle corresponding to said selected cycle of the corresponding transmitted wave train, signal combination means for combining said detection signals in second time relationships with the cycles of said detection signals corresponding to said selected cycles of the corresponding transmitted wave trains in phase with one another to produce a composite pulse corresponding to each of said transmitted signals, each pulse having a duration substantially shorter than the respective durations of said transmitted wave trains and a recognizable peak, whereby the relationships among said composite pulses are indicative of the information contained in said transmitted signals.

23. Apparatus according to claim 22 wherein said active filter means includes band-pass filter means for selecting from each of said transmitted signals as received only the component at a respective one of said frequencies, thus producing filtered detection signals, and said signal combination means includes a recorder having a plurality of tracks, recording means for recording each of said detection signals on a respective one of said tracks, and means for combining said recorded detection signals so as to produce said composite pulses.

References Cited

UNITED STATES PATENTS

| | | | |
|---|---|---|---|
| 3,037,190 | 5/1962 | Herbst. | |
| 3,197,563 | 7/1965 | Hamsher et al. | 340—171 |

RALPH D. BLAKESLEE, Primary Examiner

J. A. BRODSKY, Assistant Examiner

U.S. Cl. X.R.

179—15; 325—30, 39, 59, 321; 340—171

PO-1050
(5/69)

UNITED STATES PATENT OFFICE
CERTIFICATE OF CORRECTION

Patent No. 3,469,189 Dated October 27, 1969

Inventor(s) Park H. Miller, Jr.

It is certified that error appears in the above-identified patent and that said Letters Patent are hereby corrected as shown below:

Column 3, line 57, the comma (,) should be a semicolon (;). Column 4, line 1, "foam" should read -- form --; line 15, "meduim" should read -- medium --. Column 6, line 26, "immdiately" should read -- immediately --. Column 9, line 48, the expression "$\frac{1}{Q}$" should read -- $\frac{1}{Q}$ --.

Column 10, lines 69-70, the equation "$Q = \frac{\alpha 1/2}{\gamma}$" should read -- $Q = \frac{\sqrt{\alpha}}{\gamma}$ --; lines 72-73 the equation "$\alpha = \frac{\sqrt{\alpha}}{\gamma}$" should read -- $\alpha = \frac{R_f}{R_1}$ --.

Column 13, line 28, insert "such" after --using --. Column 14, lines 27-33, Table III, the column labeled "Wave Train Duration" should read -- .219
.220
.216
.214
.219
.217
.215
.217

SIGNED AND SEALED
MAY 26 1970

(SEAL)
Attest:

Edward M. Fletcher, Jr.
Attesting Officer

WILLIAM E. SCHUYLER, JR.
Commissioner of Patents